(12) United States Patent
Junvik et al.

(10) Patent No.: US 9,057,400 B2
(45) Date of Patent: Jun. 16, 2015

(54) CONNECTING DEVICE FOR TRANSMISSION CABLE IN VEHICLE

(75) Inventors: Peter Junvik, Bankeryd (SE); Adam Theander, Bankeryd (SE)

(73) Assignee: Kongsberg Automotive AB, Mullsjo (SE)

( * ) Notice: Subject to any disclaimer, the term of this patent is extended or adjusted under 35 U.S.C. 154(b) by 995 days.

(21) Appl. No.: 12/808,541

(22) PCT Filed: Dec. 19, 2007

(86) PCT No.: PCT/IB2007/055236
§ 371 (c)(1),
(2), (4) Date: Oct. 5, 2010

(87) PCT Pub. No.: WO2009/077815
PCT Pub. Date: Jun. 25, 2009

(65) Prior Publication Data
US 2011/0017010 A1   Jan. 27, 2011

(51) Int. Cl.
*F16C 1/10* (2006.01)
*F16C 1/26* (2006.01)

(52) U.S. Cl.
CPC ........... *F16C 1/103* (2013.01); *Y10T 74/20462* (2015.01); *F16C 1/265* (2013.01); *F16C 2361/61* (2013.01)

(58) Field of Classification Search
CPC ........... F16C 1/103; F16C 1/265; F16C 1/262
USPC ................... 74/502.4, 502.6; 248/56; 16/2.1; 403/197; 285/123.1

IPC ........................................................ B60K 23/02
See application file for complete search history.

(56) References Cited

U.S. PATENT DOCUMENTS

| 2,160,353 | A | * | 5/1939 | Conners | 285/194 |
| 3,101,205 | A | * | 8/1963 | Benham | 285/123.1 |
| 3,285,551 | A | * | 11/1966 | Tschanz | 248/56 |
| 3,415,549 | A | * | 12/1968 | Chatham | 403/197 |
| 3,562,847 | A | * | 2/1971 | Jemison | 16/2.1 |
| 4,333,361 | A | * | 6/1982 | Spease | 74/502.4 |
| 4,657,212 | A | * | 4/1987 | Gilmore et al. | 248/56 |

(Continued)

FOREIGN PATENT DOCUMENTS

| EP | 1 026 411 | 8/2000 |
| EP | 1 312 838 | 5/2003 |

(Continued)

*Primary Examiner* — Vinh Luong
(74) *Attorney, Agent, or Firm* — Mintz Levin Cohn Ferris Glovsky and Popeo, P.C.; Steve Jensen; Steven M. Jensen (57) ABSTRACT

A connecting device and a method for assembling a cable to a bracket are provided. The connecting device includes an outer body arranged circumferentially around the cable, the outer body being divided into a first portion with a substantially constant cross section and a second portion including a plurality of snap arms extending radially outwardly from a point of attachment with the first portion. The cable can be a transmission cable used in a vehicle, where the connecting device is configured to be received in an opening of the bracket, in order to anchor the cable to the vehicle body. The connecting device and cable can be received in any orientation relative to the bracket, where the snap arms are arranged in a continuous manner around the cable.

19 Claims, 6 Drawing Sheets

(56) References Cited

U.S. PATENT DOCUMENTS

| | | | |
|---|---|---|---|
| 4,773,279 A | 9/1988 | Spease et al. | |
| 4,773,280 A | 9/1988 | Baumgarten | |
| 4,887,331 A * | 12/1989 | Thomas | 16/2.1 |
| 5,241,879 A * | 9/1993 | Kelley | 74/502.4 |
| 5,579,662 A | 12/1996 | Reasoner | |
| 5,582,074 A * | 12/1996 | Kelley et al. | 74/502.4 |
| 5,653,147 A * | 8/1997 | Kelley et al. | 74/502.4 |
| 5,682,796 A * | 11/1997 | Malone | 74/502.4 |
| 5,772,159 A * | 6/1998 | Wendt | 248/56 |
| 6,189,407 B1 * | 2/2001 | Champ et al. | 74/502.4 |
| 6,340,265 B1 | 1/2002 | Suzuki et al. | |
| 6,658,706 B2 | 12/2003 | Scheidling et al. | |
| 8,141,454 B2 * | 3/2012 | Ruhlander et al. | 74/502.6 |
| 2003/0047340 A1 * | 3/2003 | Birt | 174/65 R |
| 2003/0089189 A1 | 5/2003 | Tchoi | |
| 2005/0186024 A1 * | 8/2005 | Ruhlander | 403/122 |
| 2013/0087007 A1 * | 4/2013 | Joly | 74/502.4 |

FOREIGN PATENT DOCUMENTS

| | | | | |
|---|---|---|---|---|
| FR | 2 450 373 | | 9/1980 | |
| FR | 2 936 852 | * | 4/2010 | F16H 61/36 |
| GB | 1 361 112 | * | 7/1974 | F16C 1/10 |
| GB | 2 052 000 | | 1/1981 | |
| JP | 61-125836 | * | 8/1986 | F16F 15/08 |
| JP | 2-63925 | * | 3/1990 | B60K 23/02 |
| JP | 10-103379 | * | 4/1998 | B60K 23/02 |
| WO | 98/23874 | | 6/1998 | |

* cited by examiner

CONNECTING DEVICE FOR TRANSMISSION CABLE IN VEHICLE

FIELD OF INVENTION

The subject invention relates to a cable for a transmission in a vehicle, and more particularly to a connecting device for anchoring the cable to the vehicle body.

BACKGROUND OF THE INVENTION

A vehicle generally has an engine and a transmission connected to the engine for changing the speed of the vehicle. A driver can control the transmission via a shift lever connected to the transmission by a cable. As used herein, the terms "cable" and "transmission cable" are used interchangeably. It is known to provide a connecting device to operably connect a transmission cable to a vehicle body. For example, a connecting device can be used to connect a transmission cable to a bracket or abutment of the vehicle. The connecting device should be suitably anchored with the bracket or abutment. However, existing transmission cable connecting devices suffer from various drawbacks. For example, conventionally such connecting devices are mounted transversely to the bracket or abutment member, which requires open space in front of the bracket for assembly. Such connecting devices are difficult or impossible to mount with one hand, and instead require an assembler to use both hands. Examples of connecting devices mounted transversely to a bracket or abutment member include U.S. Pat. No. 6,658,706 to Scheidling et al., which discloses a quick fastening device having a groove for receiving an abutment; and European Patent Publication 1 026 411, in which a sleeve is provided with a groove for interlocking with a plate. In both of these arrangements, the connecting device is spring-loaded to anchor with the bracket/abutment. Other examples of transversely-mounted connecting devices include U.S. Pat. No. 5,579,662 to Reasoner, which discloses guideways defined by flanges for being received within a slot of a support structure; U.S. Pat. No. 6,340,265 to Suzuki et al., in which a tubular socket is engaged with a bracket, and a nut is subsequently rotated against the bracket; and European Patent Publication 1 312 838, in which a connecting device includes a vibration-absorbing member. However, each of the arrangements disclosed in the above patent documents requires mounting of the connecting device transversely to a bracket or abutment member, instead of along an axis of the cable, and thus requires suitable open space to allow the transverse assembly operation to take place. Moreover, the above-described arrangements would be difficult or impossible for an assembler to manipulate with one hand, and instead require two hands for assembly. Further, the above arrangements are complicated and have generally tight tolerances, which could result in higher failure rates than desirable.

Figure 6A:
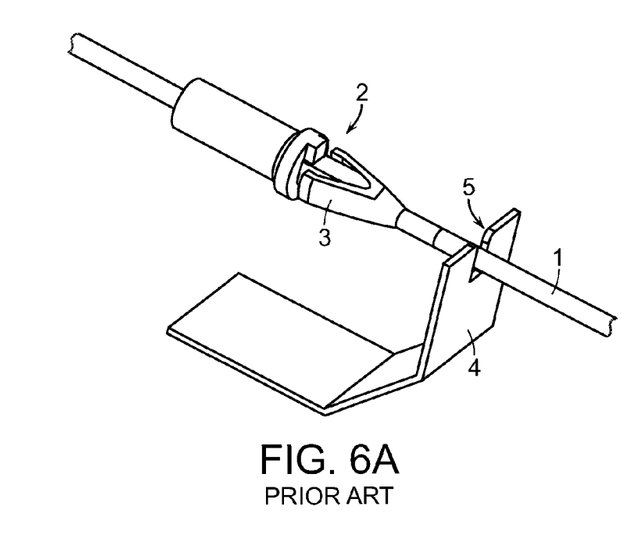
FIGS. 6A to 6C are perspective views depicting the assembly of a prior art arrangement including a transmission cable, connecting device, bracket, and clip.
Figure 6B:
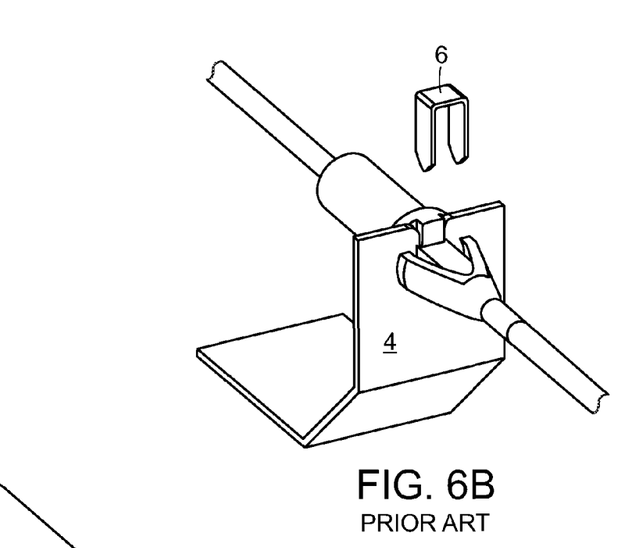
Figure 6C:
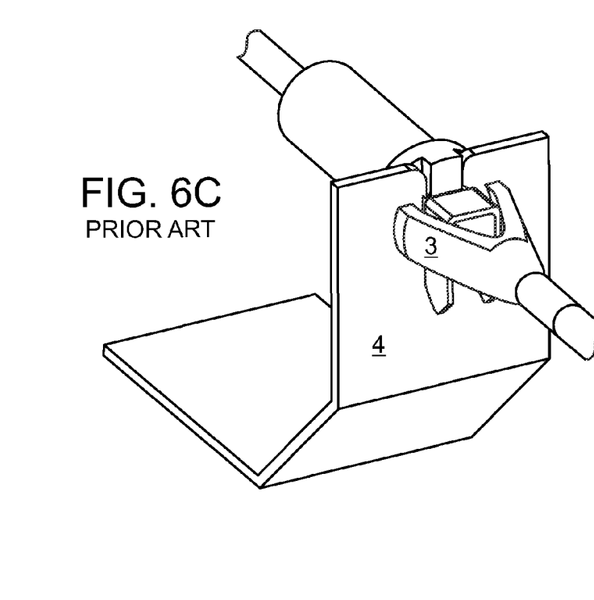

A further example of a conventional connecting device is depicted in PRIOR ART FIGS. 6A to 6C, in which a connecting device 2 connected with a cable 1 is rotated and pulled through an opening 5 in a bracket 4, so that locking elements 3 of the connecting device 2 can lock against a surface of the bracket 4. As shown in FIGS. 6B and 6C, after the connecting device 2 has been rotated and pulled through the opening 5, a clip 6 is mounted on the inside of the locking elements 3. In other words, the clip 6 is mounted transversely to the cable 1. However, this arrangement suffers from the drawback that the connecting device 2 must be secured by the clip 6, which requires an additional step during assembly. Also, during assembly, the connecting device 2 must be rotated into position relative to the bracket 4, thus making assembly more difficult.

It would be desirable to provide a connecting device for operably connecting a transmission cable to a bracket or abutment of a vehicle body in which the connecting device is assembled axially along the cable, instead of being assembled transversely with respect to the bracket, such that assembly could be accomplished preferably with one hand, and without requiring extra space around the connecting device and bracket for assembly. In other words, it would be desirable to provide a connecting device for easily mounting a transmission cable to a bracket of a vehicle body.

SUMMARY OF THE INVENTION

A connecting device and a method for assembling a cable to a bracket are provided for operably connecting the cable to a bracket or other structure of a body, where the cable can be a transmission cable used in the body of a vehicle. The connecting device includes an outer body arranged circumferentially around the cable, the outer body being divided into a first portion with a substantially constant cross section and a second portion including a plurality of snap arms extending radially outwardly from a point of attachment with the first portion.

The snap arms can extend in a direction radially outwardly from the cable, where the diameter of the connecting device increases from a proximal end of each snap arm located at the point of attachment with the first portion, to a distal end of each snap arm. In particular, the diameter of the second portion generally increases in the direction of insertion of the connecting device into the bracket. The snap arms are flexibly arranged with respect to the cable, and in particular, are configured to flex inwardly when loaded, for example, when pulled or otherwise moved through an opening. The snap arms each are formed with at least one groove arranged to interlock with the bracket.

The connecting device and cable can be received in any orientation relative to the bracket, where the snap arms are arranged substantially continuously around the cable.

A connecting device for assembling a cable to a bracket can include: an outer body having at least a first portion and a second portion, the outer body arranged circumferentially around the cable; a plurality of snap arms formed in the second portion, the snap arms extending radially outwardly from the cable, the snap arms configured to flex inwardly toward the cable; and at least one groove formed in the snap arms, the groove arranged to interlock with at least one portion of the bracket.

A method for assembling a cable to a bracket can include steps of: providing a connecting device operably connected to the cable, the connecting device including an outer body with at least first and second portions, the outer body arranged circumferentially around the cable, and the second portion including a plurality of snap arms configured to flex inwardly toward the cable; moving the connecting device along an axis of the cable such that the first portion is pulled through the opening, and the snap arms flex inwardly; and receiving at least a portion of the bracket in a groove as the snap arms move through the opening.

Other aspects and embodiments of the invention are discussed below.

BRIEF DESCRIPTION OF THE DRAWINGS

For a fuller understanding of the nature and desired objects of the subject invention, reference is made to the following detailed description taken in conjunction with the accompanying drawing figures wherein like reference character denote corresponding parts throughout the several views and wherein.

DEFINITIONS

The instant invention is most clearly understood with reference to the following definitions:

As used in the specification and claims, the singular form "a", "an" and "the" include plural references unless the context clearly dictates otherwise.

As used herein, the term "transmission cable" refers to any cable, wire, or like structure configured to be attached to a vehicle body or any part of a vehicle, and includes but is not limited to cables used in conjunction with a vehicle transmission. A transmission cable optionally may be enclosed or surrounded by a cable cover, where the terms "cable" and "cable cover" are used interchangeably to refer to the cable.

As used herein, the term "connecting device" (or "connection device") refers to any structure for connecting at least two parts or components, for example, a transmission cable and a bracket, where a suitable connecting device may include portions that connect, either directly or indirectly, to one or more other parts or components.

As used herein, the term "vehicle" refers to any type of vehicle, including but not limited to motor vehicles such as cars, trucks, vans, minivans, sport utility vehicles (SUVs), crossover-type vehicles, and other types of vehicles, and further may encompass non-motor vehicles.

DETAILED DESCRIPTION OF THE INVENTION

A connecting device and a method for assembling a cable to a bracket are provided, where the device and method can be used to operably connect the cable to a bracket or other structure of a body. The connecting device includes an outer body arranged circumferentially around the cable, the outer body being divided into a first portion with a substantially constant cross section and a second portion including a plurality of snap arms extending radially outwardly from a point of attachment with the first portion. The snap arms preferably are evenly distributed around the cable, such that the snap arms have approximately the same size. However, in alternate embodiments, it is possible for the snap arms to have different sizes.

The snap arms preferably are arranged circumferentially continuously around the cable, so that the connecting device can be presented in any orientation relative to the bracket. Although there may be small gaps between the snap arms, the surface of the snap arms preferably is substantially consistent regardless of the orientation or rotation of the snap arms relative to an axis of the cable. In other words, the connecting device can be advanced in substantially any orientation relative to the bracket.

The snap arms generally extend in a direction radially outwardly from the cable, where an outer surface of each snap arm preferably is wedge-shaped, and the diameter of the connecting device increases from a proximal end of each snap arm located at the point of attachment with the first portion, to a distal end of each snap arm. In particular, the diameter of the second portion generally increases in the direction of insertion of the connecting device into the bracket. The snap arms are flexibly arranged with respect to the cable, and in particular, are configured to flex inwardly when loaded, for example, when pulled or otherwise moved through an opening. The snap arms each are formed with at least one groove arranged to interlock with a wall of the opening in the bracket.

The connecting device can be arranged with respect to a transmission cable of a vehicle, such that after assembly, the connecting device becomes anchored to a bracket or other structure of the vehicle body. In particular, the connecting device is assembled to the bracket by moving the cable with the connecting device through an opening in the bracket. The opening of the bracket preferably is smaller than a diameter of the snap arms when unloaded but larger than a diameter of the first portion of the outer body of the connecting device, thus allowing free movement of the first portion through the opening of the bracket, but restricting movement of the second portion incorporating the snap arms. When the second portion of the outer body of the connecting device is advanced through the opening in the bracket, the snap arms will flex inwardly toward the cable until the bracket snaps into the grooves, thereby interlocking the bracket with the connecting device.

Figure 1:
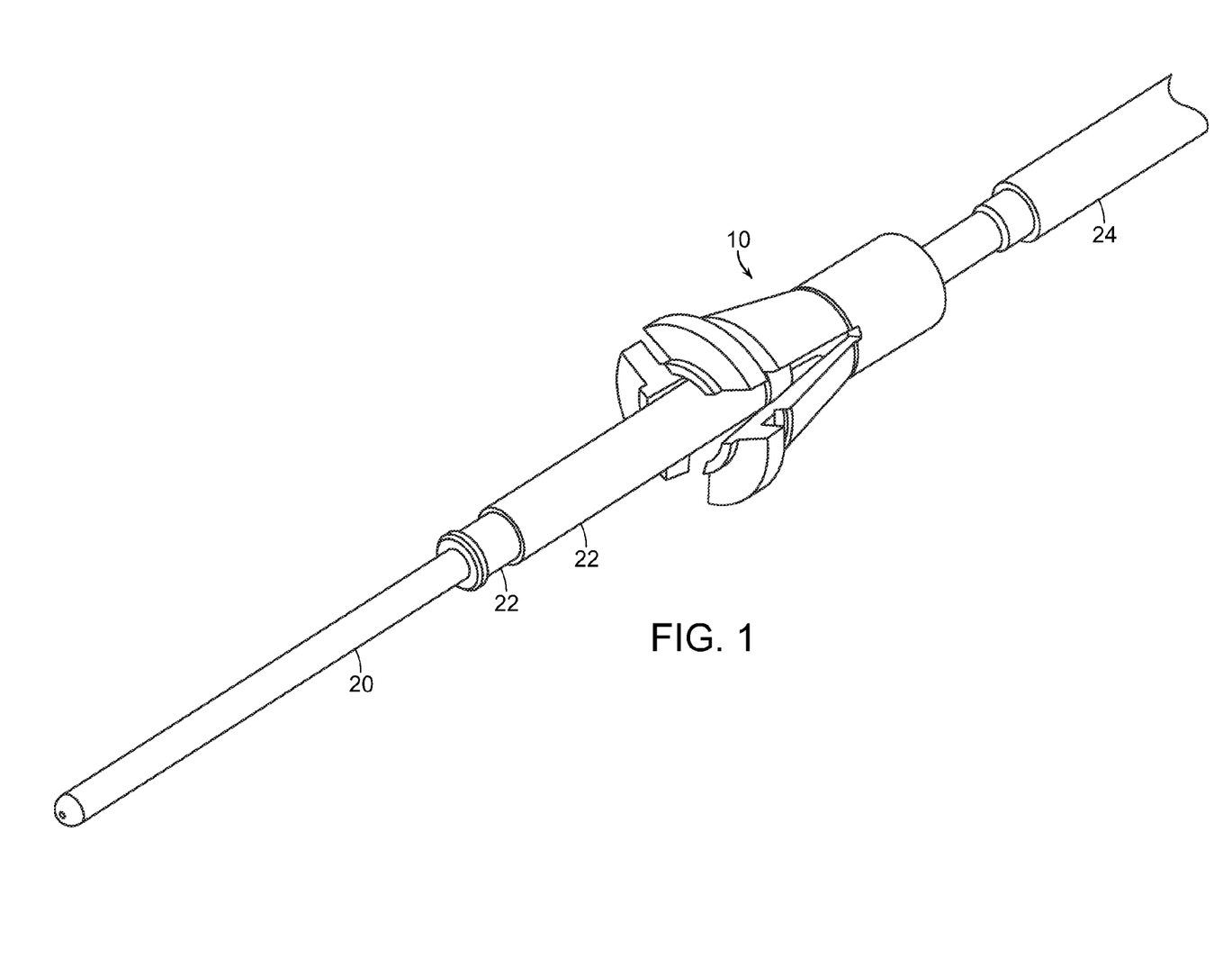
FIG. 1 is a perspective view of a connecting device operably connected to a transmission cable according to a first preferred embodiment of the subject invention.

A connecting device 10 according to a first preferred embodiment of the subject invention is depicted in FIGS. 1 and 2A-2C. As shown in FIG. 1, the connecting device 10 is arranged circumferentially around a cable 20, where the cable 20 optionally may include a cable cover. As used herein, the term "cable" is not limited to a transmission cable itself, but also refers to a cable cover that optionally may be provided to enclose or surround the cable. For example, in FIG. 1 and elsewhere in the drawings, the cable 20 can be a cable itself and/or a cable covered by a cable cover.

Figure 5:
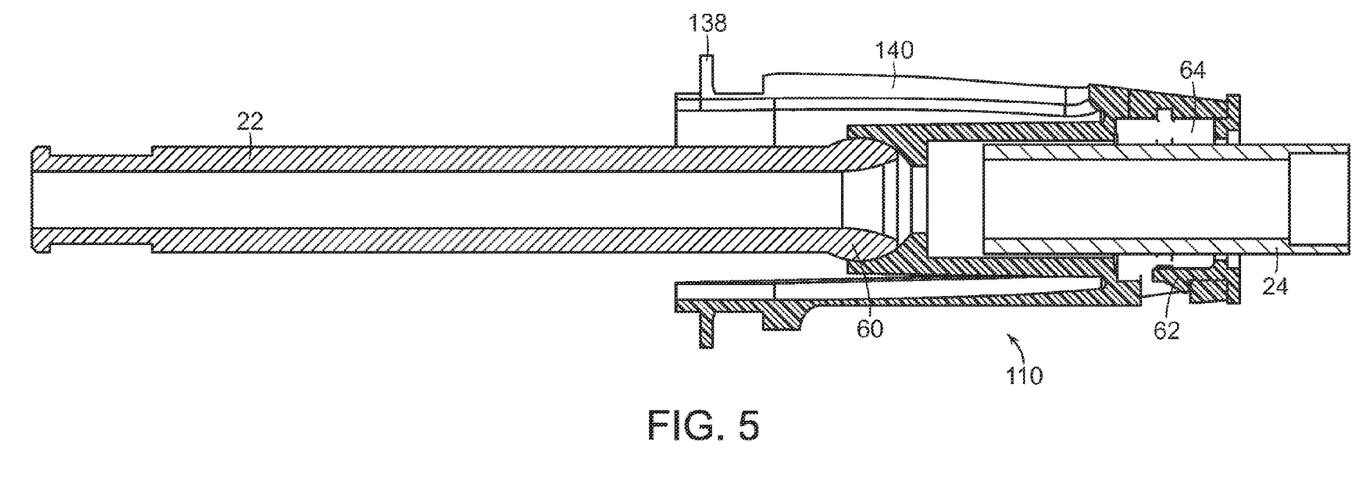
FIG. 5 is a partial cross-sectional side view of the connecting device assembled to the bracket, as shown in FIG. 4.

In particular, the connecting device 10 is attached to a swiveling tube 22 on one end of the connecting device 10, where the swiveling tube 22 is preferably fitted over the cable 20. An opposite end (i.e., the other end) of the connecting device 10 is configured to receive a shrink pipe 24. Details of interconnections between the connecting device 10 and the swiveling tube 22, and between the connecting device 10 and the shrink pipe 24 are shown in FIG. 5. Further, the connecting device 10 preferably is formed internally with a joint, such as an integrated ball joint (see, e.g., FIG. 5), for operably connecting the connecting device 10 with the swiveling tube 22, and a locking cap (see, e.g., FIG. 5) for operably connecting the connecting device 10 with the shrink pipe 24.

Preferably the connecting device 10 is fixed relative to the cable 20, such that the connecting device 10 substantially does not move axially with respect to the cable 20 during assembly of the connecting device 10 with a bracket.

Figure 2A:
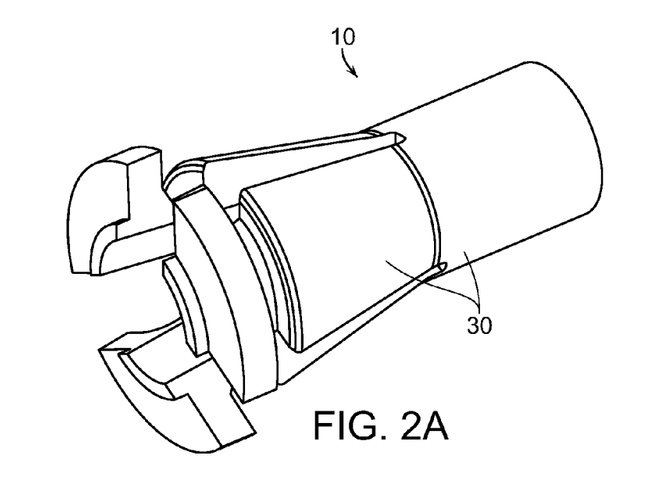
FIG. 2A is an isolated perspective view of the connecting device shown in FIG. 1.
Figure 2B:
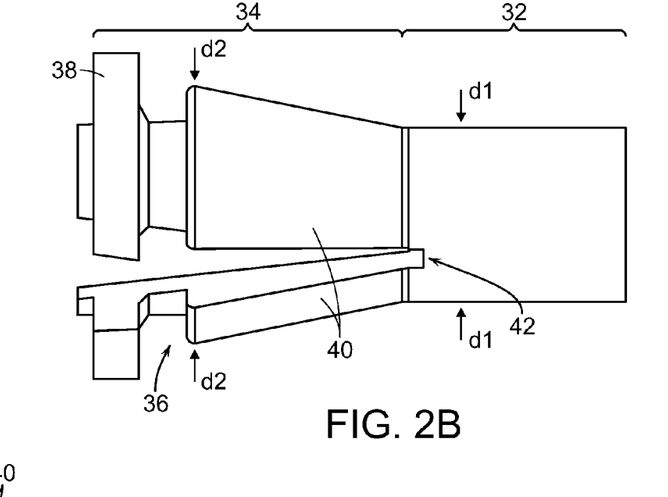
FIG. 2B is a cross-sectional side view of the connecting device of FIG. 2A.
Figure 2C:
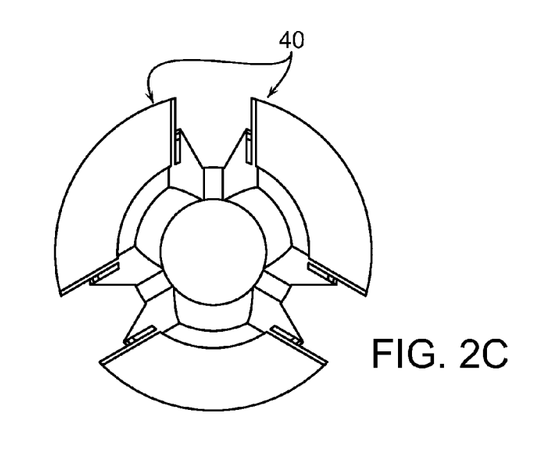
FIG. 2C is a cross-sectional end view of the connecting device of FIG. 2A.

The connecting device 10 is shown in greater detail in FIGS. 2A-2C. The connecting device 10 includes an outer body 30 divided into at least a first portion 32 and a second portion 34. The first portion 32 of the outer body 30 preferably has a substantially constant diameter, with a uniform cross-section of "first diameter" $d_1$. The second portion 34 of the outer body 30 includes a plurality of snap arms 40 that extend radially outwardly from a point of attachment 42 formed at a junction between the first and second portions 32, 34. The snap arms 40 are separated from each other by cut-out portions, which can be pre-formed, for example, by making one or more cuts axially along the second portion 34.

The snap arms 40 are arranged to flex inwardly when subjected to a force or load, where the second portion 34 has a "second diameter" $d_2$ in the region depicted in FIG. 2B, that is, just before the groove 36. The second diameter $d_2$ preferably is greater than the first diameter $d_1$ in the unloaded state of FIGS. 2A-2C. The snap arms 40 preferably are flexibly arranged with respect to the cable 20, and can be compressed or collapsed inwardly toward the cable 20 when subjected to sufficient loads. The cable 20 is arranged circumferentially inside the connecting device 10, and thus the cable is enclosed by the first and second portions 32, 34 of the outer body 30.

Each snap arm 40 has a proximal end defined by its connection with the first portion 32 at the point of attachment 42, and a diameter that preferably increases gradually toward a distal end of the snap arm 40, where at least one groove 36 is formed near the distal end of the snap arm 40. Preferably, the groove 36 of each snap arm 40 is aligned, such that each groove 36 is configured to receive at least a portion of a bracket. A rim 38 is provided at the distal end to engage with the bracket.

Figure 3:
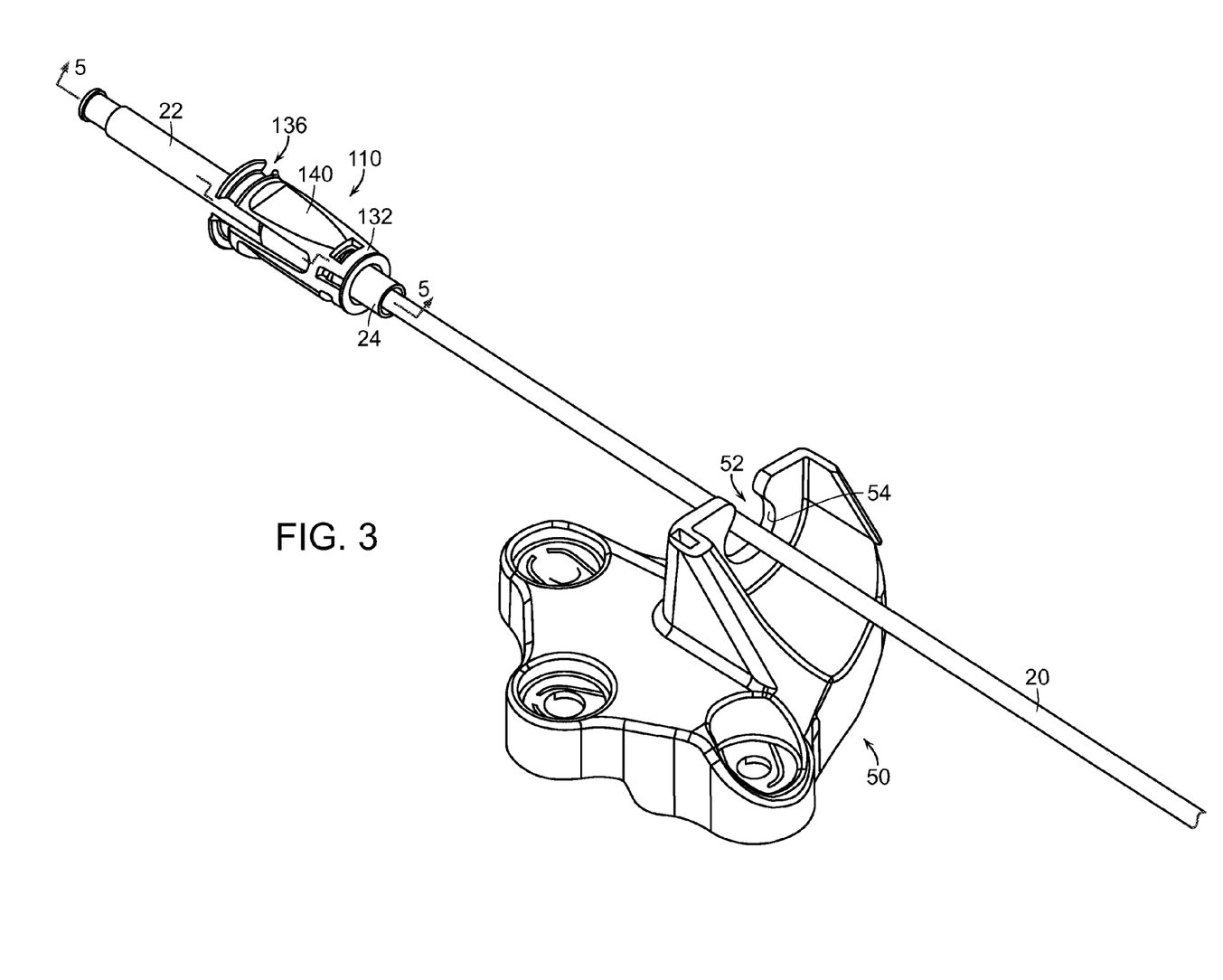
FIG. 3 is a perspective view of a connecting device operably connected to a transmission cable according to a second preferred embodiment of the subject invention, where the connecting device is shown in relation to a bracket prior to assembly.
Figure 4:
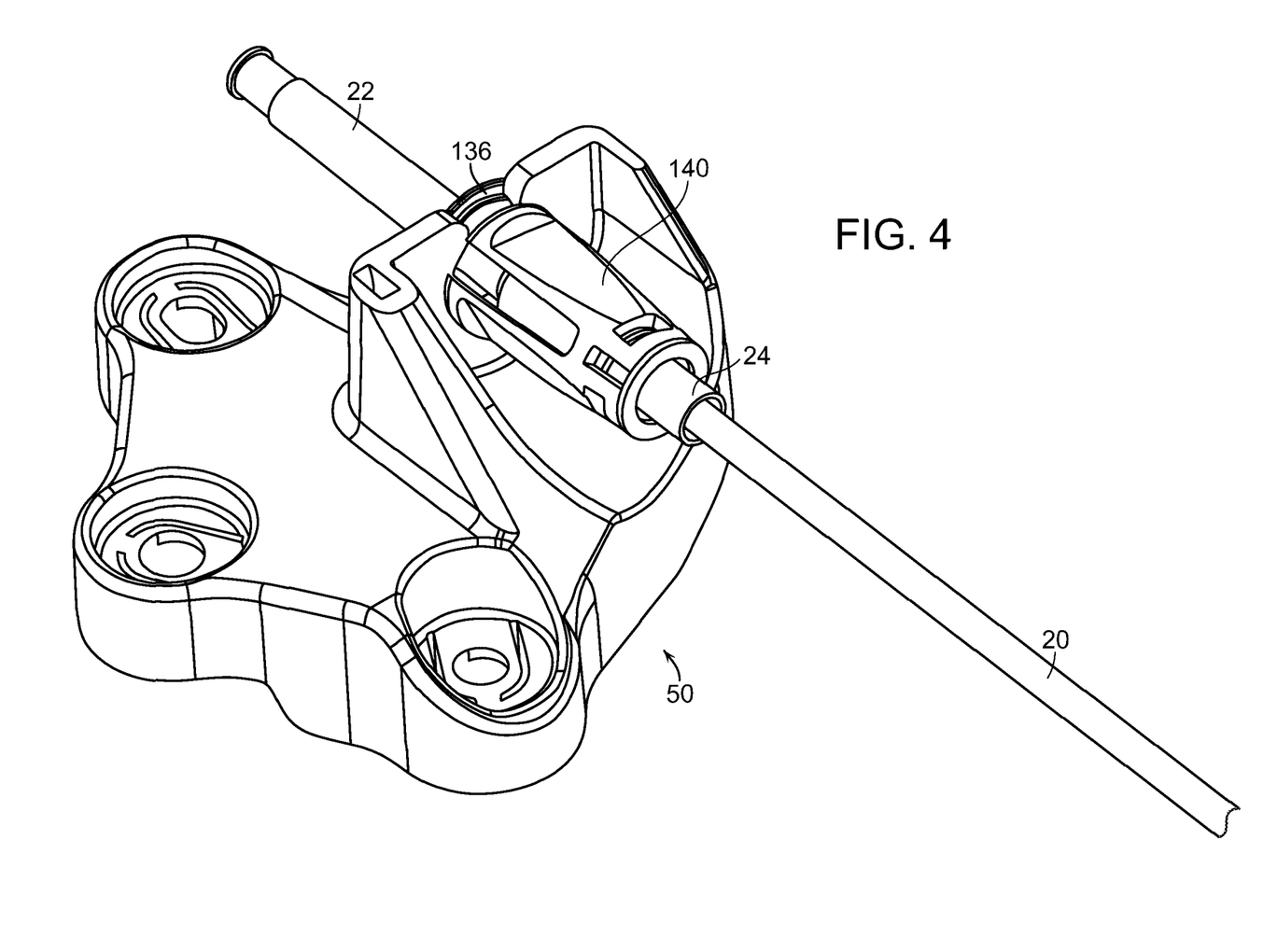
FIG. 4 is a perspective view of the connecting device operably connected to the transmission cable, as shown in FIG. 3, where the connecting device is assembled to the bracket.

A connecting device 110 according to a second preferred embodiment of the subject invention is depicted in FIGS. 3 and 4, along with a method for assembling a cable with a bracket. The connecting device 110 is similar in structure and function to the connecting device 10 depicted in FIGS. 1 and 2A-2C, and includes similar components. In the second preferred embodiment of FIGS. 3 and 4, elements that are similar to corresponding elements in the first preferred embodiment of FIGS. 1 and 2A-2C have like reference numerals, where any differences are recognized by adding a "1" before the reference numeral, such as the connecting device 110 in FIGS. 3 and 4 as compared to the connecting device 10 in FIGS. 1 and 2.

Referring to FIGS. 3 and 4, the cable 20 can be a transmission cable in a vehicle, and preferably is operably connected to the connecting device 110, for example, via the shrink pipe 24. In FIGS. 3 and 4, the connecting device 110 is fixed to the cable 20 via the shrink pipe 24, such that there is substantially no axial movement of the connecting device 10 with respect to the cable 20. Details of interconnections between the swiveling tube 22 and the connecting device 110, and between the shrink pipe 24 and the connecting device 110 are depicted in FIG. 5.

As described with respect to the first preferred embodiment, the cable 20 is configured to be received through the swiveling tube 22. As shown in FIG. 5, the swiveling tube 22 is operably connected to one end of the connecting device 110 by an integrated ball joint 60, where the ball joint 60 permits at least a swiveling movement of the swiveling tube 22 relative to the connecting device 110. Alternatively, the integrated ball joint 60 could be replaced by any other suitable type of joint that permits interconnection of the swiveling tube 22 and the connecting device 110.

As shown in FIG. 5, the shrink tube 24 is operably connected to the other end (another end) of the connecting device 110 by a locking cap 62. For example, the locking cap 62 may interact with a corresponding portion of the shrink tube 24 to prevent disengagement of the shrink tube 24 relative to the end of the connecting device 110. As described above, the cable 20 preferably is fixedly attached to the shrink tube 24, such that when the shrink tube 24 is received in the connecting device 110, the cable 20 is fixed relative to the connecting device 110. As shown in FIG. 5, the shrink tube 24 is retained on the connecting device 110 by the locking cap 62. The connecting device 110 optionally can be formed with at least one vibration damping pad 64 in order to dampen vibrations from the gear box.

Referring again to FIGS. 3 and 4, the cable 20 is aligned with an opening 52 of a bracket 50. The opening 52 preferably is larger than a diameter of the cable 20, so that alignment of the cable 20 axially through the opening 52 is accomplished easily. The bracket 50 preferably is fixed to the vehicle body. The connecting device 110 can be advanced axially along with the cable 20, such that the first portion 132 of the connecting device 110 moves freely through the opening 52, where the first diameter $d_1$ of the first portion 132 is smaller than a diameter of the opening 52. Advancement of the connecting device 110 and cable 20 can be performed manually, for example, by pulling or otherwise moving these components, or can be performed automatically.

As the second portion 134 of the connecting device 110 is moved through the opening 52, outer surfaces of the snap arms 140 contact an inner wall 54 of the opening 52, at least because the second diameter $d_2$ of the snap arms 140 is greater than the diameter of the opening 52. Thus, the snap arms 140 are subjected to a load, and flex inwardly toward the cable 20 as a result of the load. As shown in FIG. 4, as the connecting device 110 is advanced through the bracket 50, the inner wall 54 of the opening 52 will engage the at least one groove 136 provided in the snap arms 140. In other words, as the snap arms 140 advance relative to the opening 52 of the bracket 50, the inner wall 54 will tend to snap in place in the groove 136. Thus, the connecting device 110 and the cable 20 will become interlocked when the inner wall 54 of the opening 52 is received in the groove 136.

As described above, the connecting device 110 fixed to the cable 20 can be inserted easily into the opening 52 of the bracket 50 simply by pulling the connecting device and cable through the opening until the inner wall 54 of the opening 52 becomes engaged with the groove 136. This operation can be performed manually with one hand, as compared to prior art assembly techniques in which a connecting device is arranged transversely to a bracket, and two hands are required for assembly. Moreover, because the entire operation is performed along an axial direction of the cable, it is not necessary to provide additional space in a direction transverse to the cable.

Further, the snap arms 140 preferably are arranged substantially continuously in a circumferential direction around the cable 20 fixed to the connecting device 110, and as a result, the connecting device 110 can be advanced in any orientation to the bracket 50. In other words, the snap arms 140 do not need to face in any particular direction in order to allow the connecting device 110 to become interlocked with the bracket 50. Preferably the connecting device 110 fixed to the cable 20 can be rotated axially along an axis of the cable 20, but according to the subject invention, the connecting device 110 can form a suitable connection with the bracket 50 without requiring the snap arms 140 to be oriented or rotated in any particular direction with respect to the opening 52 of the bracket 50.

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications and other references cited herein are hereby expressly incorporated herein in their entireties by reference.

What is claimed is:

1. A connecting device for assembling a cable to a bracket, comprising:
    an outer body having at least a first portion and a second portion, the outer body arranged circumferentially around the cable such that the cable extends through an entire length of the outer body;
    a plurality of snap arms formed in the second portion, the snap arms extending radially outwardly from the cable and arranged closely adjacent to each other and circumferentially surrounding the cable, the snap arms configured to flex inwardly toward the cable, and terminating in a rim arranged at a distal end of the snap arms; and
    at least one groove one-piece formed in the snap arms, the groove defined by the rim arranged at the distal end and arranged to interlock with at least one portion of the bracket,
    wherein the connecting device is fixed relative to the cable, such that the connecting device substantially does not move axially with respect to the cable during assembly of the connecting device with the bracket.

2. The connecting device of claim 1, wherein during assembly with the bracket, the connecting device is moved through an opening having a size greater than an outer diameter of the first portion and smaller than an outer diameter of the second portion, such that the snap arms flex inwardly during movement of the connecting device through the opening.

3. The connecting device of claim 2, wherein the at least one portion of the bracket is received in the groove as the connecting device is moved through the opening.

4. The connecting device of claim 1, wherein the plurality of snap arms are approximately the same size.

5. The connecting device of claim 1, wherein the connecting device is operably connected to the cable.

6. The connecting device of claim 5, wherein the connecting device is connected to at least a shrink pipe that encloses the cable.

7. The connecting device of claim 6, wherein the shrink pipe is connected to the connecting device by a locking cap.

8. The connecting device of claim 5, wherein the connecting device is connected to at least a swiveling tube that encloses the cable.

9. The connecting device of claim 5, wherein the connecting device is fixed relative to the cable.

10. The connecting device of claim 1, wherein the groove is configured to receive an inner wall of the bracket to interlock the connecting device and the bracket.

11. A connecting device for use in a transmission assembly of a vehicle, comprising:
    the connecting device operably connected to a cable, the connecting device including an outer body with at least first and second portions, the outer body arranged circumferentially around the cable such that the cable extends through an entire length of the outer body;
    a plurality of snap arms formed in the second portion, the snap arms extending radially outwardly from the cable and arranged closely adjacent to each other and circumferentially surrounding the cable, the snap arms configured to flex inwardly toward the cable, and terminating in a rim arranged at a distal end of the snap arms; and
    at least one groove one-piece formed in the snap arms, the groove defined by the rim arranged at the distal end and arranged to interlock with a bracket of the transmission assembly,
    wherein the connecting device is fixed relative to the cable, such that the connecting device substantially does not move axially with respect to the cable during assembly of the connecting device with the bracket.

12. The connecting device of claim 11, wherein the bracket is formed with an opening defined by an inner wall.

13. The connecting device of claim 12, wherein the connecting device is assembled with the bracket by moving the connecting device along an axis of the cable such that the first portion of the outer body moves through the opening, and the second portion of the outer body engages the inner wall and flexes inwardly.

14. The connecting device of claim 13, wherein the inner wall of the bracket is received in the groove as the second portion of the outer body is moved through the opening.

15. A method for assembling a cable to a bracket, comprising the steps of:
    providing a connecting device operably connected to the cable, the connecting device including an outer body with at least first and second portions, the outer body arranged circumferentially around the cable such that the cable extends through an entire length of the outer body, and the second portion including a plurality of snap arms configured to flex inwardly toward the cable and arranged closely adjacent to each other and circumferentially surrounding the cable, and terminating in a rim arranged at a distal end of the snap arms;
    moving the connecting device along an axis of the cable such that the first portion is pulled through the opening, and the snap arms flex inwardly; and
    receiving at least a portion of the bracket in a groove one-piece formed in the snap arms, the groove defined by the rim arranged at the distal end as the snap arms move through the opening,
    wherein the connecting device is fixed relative to the cable, such that the connecting device substantially does not move axially with respect to the cable during assembly of the connecting device with the bracket.

16. The method of claim 15, wherein the connecting device is fixed relative to the cable.

17. A connecting device for assembling a cable to a bracket, comprising:
    an outer body having at least a first portion and a second portion, the outer body arranged circumferentially around the cable such that the cable extends through an entire length of the outer body, wherein the first portion has a substantially constant outer diameter;
    a plurality of snap arms formed in the second portion, the snap arms extending radially outwardly from the cable, the snap arms configured to flex inwardly toward the cable and arranged closely adjacent to each other and circumferentially surrounding the cable, having an outer diameter that increases in a direction away from the first portion, and terminating in a rim arranged at a distal end of the snap arms; and at least one groove one-piece formed in the snap arms, the groove defined by the rim arranged at the distal end and arranged to interlock with at least one portion of the bracket, wherein the connecting device is fixed relative to the cable, such that the connecting device substantially does not move axially with respect to the cable during assembly of the connecting device with the bracket.

18. The connecting device of claim 17, wherein during assembly with the bracket, the connecting device is moved through an opening having a size greater than the outer diameter of the first portion and smaller than the outer diameter of the second portion, such that the snap arms flex inwardly during movement of the connecting device through the opening.

19. The connecting device of claim 18, wherein the at least one portion of the bracket is received in the groove as the connecting device is moved through the opening.

* * * * *